US010815967B2

(12) United States Patent
Geisler et al.

(10) Patent No.: US 10,815,967 B2
(45) Date of Patent: Oct. 27, 2020

(54) CONTROL SYSTEM AND METHOD FOR OPERATING A PLURALITY OF WIND TURBINES

(71) Applicant: SENVION GmbH, Hamburg (DE)

(72) Inventors: Jens Geisler, Rendsburg (DE); Jesse Ben Benjamin Schmuck, Flensburg (DE)

(73) Assignee: Senvion GmbH, Hamburg (DE)

(*) Notice: Subject to any disclaimer, the term of this patent is extended or adjusted under 35 U.S.C. 154(b) by 57 days.

(21) Appl. No.: 16/167,760

(22) Filed: Oct. 23, 2018

(65) Prior Publication Data

US 2019/0120209 A1 Apr. 25, 2019

(30) Foreign Application Priority Data

Oct. 23, 2017 (DE) .................. 10 2017 009 838

(51) Int. Cl.
*G05B 13/04* (2006.01)
*F03D 7/04* (2006.01)
(Continued)

(52) U.S. Cl.
CPC .............. *F03D 7/045* (2013.01); *F03D 1/00* (2013.01); *F03D 7/0224* (2013.01); *F03D 7/048* (2013.01);
(Continued)

(58) Field of Classification Search
CPC .......... F03D 1/00; F03D 7/0224; F03D 7/045; F03D 7/048; F05B 2220/30;
(Continued)

(56) References Cited

U.S. PATENT DOCUMENTS

2013/0255363 A1 10/2013 Merida et al.
2013/0300115 A1 11/2013 Seem et al.
(Continued)

FOREIGN PATENT DOCUMENTS

EP 1790851 A2 5/2007
EP 2063108 A2 5/2009
(Continued)

OTHER PUBLICATIONS

Naumov, I. V., Mikkelsen, R. F., & Okulov, V. 2016. Estimation of wake propagation behind the rotors of wind powered generators. Thermal Engineering, 633, 208-213 accessed from <<https://doi.org/10.1134/S0040601516030071>> on Feb. 7, 2020 (Year: 2016).*
(Continued)

*Primary Examiner* — Michael J Huntley
(74) *Attorney, Agent, or Firm* — Alix, Yale & Ristas, LLP

(57) ABSTRACT

A method for operating a first wind turbine and a second wind turbine, the second wind turbine being located in the wake of the first wind turbine. A prediction model is fed with a current wind value of the first wind turbine, in order to predict a future time point at which the area swept by the rotor of the second wind turbine becomes partially overlapped by the wake of the first wind turbine. The second wind turbine reacts to the prediction in that a control signal is generated in order to alter the pitch angle of a rotor blade of the second wind turbine relative to the pitch angle of another rotor blade of the second wind turbine. The invention additionally relates to a control system suitable for executing the method. Implementation of the disclosed method by a control system can reduce the loading of the second wind turbine.

18 Claims, 5 Drawing Sheets

(51) Int. Cl.
*F03D 1/00* (2006.01)
*F03D 7/02* (2006.01)

(52) U.S. Cl.
CPC ........ *G05B 13/048* (2013.01); *F05B 2220/30* (2013.01); *F05B 2260/80* (2013.01); *F05B 2260/821* (2013.01); *F05B 2260/8211* (2013.01); *F05B 2260/84* (2013.01); *F05B 2270/111* (2013.01); *F05B 2270/20* (2013.01); *F05B 2270/32* (2013.01); *F05B 2270/321* (2013.01); *F05B 2270/404* (2013.01)

(58) Field of Classification Search
CPC ............ F05B 2260/80; F05B 2260/821; F05B 2260/8211; F05B 2260/84; F05B 2270/111; F05B 2270/20; F05B 2270/32; F05B 2270/321; F05B 2270/404; G05B 13/048
See application file for complete search history.

(56) References Cited

U.S. PATENT DOCUMENTS

| | | | |
|---|---|---|---|
| 2015/0050144 A1* | 2/2015 | Westergaard | F03D 7/028 416/1 |
| 2015/0086356 A1* | 3/2015 | Perley | F03D 7/0292 416/1 |
| 2015/0308416 A1 | 10/2015 | Ambekar et al. | |
| 2016/0146190 A1 | 5/2016 | Ravindra et al. | |
| 2016/0215759 A1* | 7/2016 | Fleming | F03D 7/046 |
| 2016/0230741 A1* | 8/2016 | Brath | F03D 7/0224 |
| 2017/0022974 A1 | 1/2017 | Roma | |
| 2017/0356421 A1 | 12/2017 | Petitjean et al. | |
| 2018/0030955 A1* | 2/2018 | Vaddi | F03D 17/00 |
| 2018/0100486 A1 | 4/2018 | Otake et al. | |
| 2019/0072075 A1* | 3/2019 | Wang | G06F 30/17 |

FOREIGN PATENT DOCUMENTS

| | | |
|---|---|---|
| EP | 2757255 A1 | 7/2014 |
| EP | 2767710 A2 | 8/2014 |
| WO | 2011160634 A1 | 12/2011 |
| WO | 2013037374 A1 | 3/2013 |
| WO | 2014018956 A1 | 1/2014 |
| WO | 2015039665 A1 | 3/2015 |
| WO | 2018050185 A1 | 3/2018 |

OTHER PUBLICATIONS

Göçmen, Tuhfe, et al., "Estimation of turbulence intensity using rotor effective wind speed in Lillgrund and Horns Rev-I offshore wind farms", Renewable Energy vol. 99, pp. 524-532, Dec. 2016 retrieved from <<https://www.sciencedirect.com/science/article/pii/S0960148116306346#cebib0010>> on Feb. 11, 2020 (Year: 2016).*

Branlard, Emmanuel, "Wind energy: On the statistics of gusts and their propagation through a wind farm" ECN: Netherlands, Feb. 2009 retrieved from <<http://emmanuel.branlard.free.fr/work/papers/theses/Branlard-2009-Gusts_Propagation_Wind_Farm.pdf>> on Feb. 11, 2020 (Year: 2009).*

Search Report for German Patent Application No. 102017009838.7 dated Jul. 10, 2018.

* cited by examiner

CONTROL SYSTEM AND METHOD FOR OPERATING A PLURALITY OF WIND TURBINES

BACKGROUND

The invention relates to a method for operating a first wind turbine and a second wind turbine, the second wind turbine being located in the wake of the first wind turbine. The invention additionally relates to a control system for wind turbines.

If two wind turbines are operated adjacently to each other, there arises the problem that inconsistent wind conditions, by which the second wind turbine may be subjected to greater loading, may prevail in the wake of the first wind turbine, EP 2 063 108 A2, EP 1 790 851 A2, WO 2015/039 665 A1, WO 2011/160 634 A1.

SUMMARY OF THE INVENTION

The invention is based on the object of presenting a control system and a method for operating a plurality of wind turbines, such that the loading of the second wind turbine located in the wake of a first wind turbine is reduced. Proceeding from the known prior art, the object is achieved with the features of the independent claims. Advantageous embodiments are specified in the dependent claims.

In the case of the method according to the invention, a prediction model is fed with a current wind value of the first wind turbine, in order to predict a future time point at which the area swept by the rotor of the second wind turbine becomes partially overlapped by the wake of the first wind turbine. The second wind turbine reacts to the prediction in that a control signal is generated in order to alter the pitch angle of a rotor blade of the second wind turbine relative to the pitch angle of another rotor blade of the second wind turbine. In one embodiment, the control signal is generated before the future time point.

If the wake of a first wind turbine impinges only partially on the rotor of a second wind turbine, the rotor of the second wind turbine is loaded asymmetrically. The invention is based on the concept of counteracting the asymmetrical loading of the rotor, in that one of the rotor blades is adjusted relative to the other rotor blades, the adjustment being effected preventatively, i.e. at a time point before the increased loading acts upon the rotor (pre-control).

Embodiments of the disclosed prediction model may incorporate assumptions applied to information provided to the prediction model. According to aspects of the invention, assumptions may be implemented as computational rules based upon physical laws governing the behaviour of fluids such as the air mass-flow acting upon a wind turbine. For example, the prediction model may be based on the assumption that the wake extends downwind from the rotor of the first wind turbine along an extension of the rotor axis of the first wind turbine. The area swept by the rotor of the first wind turbine may be assumed as a starting point for the cross section of the wake. The prediction model may be based on the assumption that, starting from this starting point, the wake propagates with a cylindrical cross section along the direction of the rotor axis. The prediction model may be based on the assumption that the wake widens in the radial direction as the distance from the rotor of the first wind turbine increases. The prediction model may be based on the assumption that the wind speed in the wake is reduced in comparison with a wind field that is not disturbed by the first wind turbine. The prediction model may be based on the assumption that the wind speed in the wake has a radial distribution according to which the wind speed in the center of the wake is less than in the periphery of the wake. The prediction model may be based on the assumption that the turbulence intensity in the wake is increased in comparison with a wind field that is not disturbed by the first wind turbine.

The prediction model may be based on the assumption that, starting from the first wind turbine, the wake propagates at a speed that corresponds to the wind speed. The prediction model may be fed with a wind speed value from which the propagation speed of the wake is determined.

The prediction model may be based on the assumption that the wake propagates in the wind direction. The prediction model may be fed with a wind direction value from which the propagation direction of the wake is determined.

The current wind speed value and/or the current wind direction value may be measured values. A measured value may be obtained by means of an anemometer. The anemometer may be arranged, for example, on the nacelle of a wind turbine.

It is also possible for the current wind speed value and/or the current wind direction value to be an estimated value. In many cases, values estimated on the basis of established parameters have greater reliability, compared with measured values. For greater reliability it is advantageous if the estimated values are derived from the air-mass flow acting upon the entire rotor. A substantially greater measurement area is thus available, in comparison with an anemometer arranged on the wind turbine. In particular, the estimated values may be derived from operating parameters of the wind turbine, which are selected such that there is a dependence between the operating parameters and the air-mass flow acting upon the rotor. Thus, if the air-mass flow acting upon the rotor changes, there is a resultant change, dependent thereon, in the operating parameters. Possible operating parameters of a wind turbine that may be taken into account in the determination of an estimated wind value are, for example, the rotational speed of the rotor, the pitch angle of one or more rotor blades, the torque of the generator, an inclination of the tower and/or the deformation of a rotor blade. In particular, a change in one of these quantities may be included in the determination of an estimated wind value. A plurality of these operating parameters, in particular at least three of these operating parameters, may be taken into account in the determination of the estimated values. Furthermore, an estimated air density, or air density determined on the basis of measurement data, may advantageously be taken into account.

Wind turbines typically include sensors and measurements of the condition and operating parameters of a wind turbine on a periodic or continuous basis, so data corresponding to the operating parameters of the wind turbine are available for any given point in time. This data is communicated to a computer and processed to determine a current estimated wind value for a wind turbine at a time point. The current estimated wind value may include a current estimated wind speed value and/or a current estimated wind direction value at a time point. According to aspects of the invention, the current estimated wind value may be used as a current wind value in the prediction model.

The current wind speed value and/or the current wind direction value may be obtained in the case of the first wind turbine. The prediction model can thus be based on the assumption that the wake propagates with the wind direction acting upon the first wind turbine.

The current wind speed value and/or the current wind direction value may be obtained in the case of the second wind turbine. The prediction model can thus be based on the assumption that the wake of the first wind turbine propagates according to the wind direction in the case of the second wind turbine.

The prediction model may be designed such that, in the prediction of the propagation direction of the wake, both a current wind direction value of the first wind turbine and a current wind direction value of the second wind turbine are taken into account. For example, a propagation direction of the wake that is between the two wind directions may be assumed if the current wind direction value of the first wind turbine and the current wind direction value of the second wind turbine differ from each other.

The prediction model may be designed such that, in the prediction of the propagation speed of the wake, both wind speed values of the first wind turbine and wind speed values of the second wind turbine are taken into account. For example, a propagation speed of the wake that is between the two wind speeds may be assumed if the wind direction values of the first wind turbine and of the second wind turbine differ from each other.

Once the prediction model has estimated a propagation speed and a propagation direction for the wake, it can then be predicted, from the relative positions of the first wind turbine and the second wind turbine in relation to each other, at which future time point the second wind turbine is subjected to a particular effect of the wake of the first wind turbine.

The geographical positions of the first wind turbine and of the second wind turbine may be represented in a coordinate system. If the predicted wake is mapped into the coordinate system, the degree of overlap between the wake and the rotor of the second wind turbine can be determined. In particular, the axial distance between the first wind turbine and the second wind turbine, measured along an axis of the wake, can be determined. In addition, a radial distance between an axis of the wake and the axis of the second wind turbine can be determined. The degree of overlap between the wake and the area swept by the rotor of the second wind turbine is obtained from the radial distance.

The wake model may comprise a module for predicting the turbulence intensity. For this purpose, a current value of the turbulence intensity in the case of the first wind turbine can be obtained. The propagation of the turbulence intensity may be estimated by means of the prediction model, and a prediction for the turbulence intensity at a future time point in the case of the second wind turbine derived therefrom. In this case, it may be taken into account in the prediction model that the turbulence intensity in the wake is generally higher than in an undisturbed wind field. The current value of the turbulence intensity in the case of the first wind turbine may be derived, for example, from a standard deviation of the output power of the first wind turbine.

In a simple variant, in the case of a change in the current wind direction in the region of the first wind turbine, the prediction model may proceed such that the change in the wind direction is transferred directly to the wake. This means that the predicted wake changes its direction simultaneously with the wind direction. The speed at which the wake moves in the new direction may be derived from the current wind speed. The time lag after which the wake has propagated in the new direction, as far as the second wind turbine, can be predicted on the basis of the axial distance between the first and the second wind turbine. The sum of the current time point and the time lag gives the future time point to which the prediction applies.

Analyses have shown that, in practice, changes in the wind direction only continue into the wake with a certain time lag. This can be taken into account in the prediction model, in that the time span within which a change in wind direction propagates as far as the second wind turbine is determined as the sum of a time lag, which is derived from the current wind speed value, and a wake-related additional time, which results from the fact that the wake does not directly follow a change in the wind direction.

Precise determination of the additional time is not entirely simple. On the other hand, the exact prediction of the future time point and of the degree of overlap between the wake and the rotor of the second wind turbine is crucial for the success of the method. If there is a pre-control in the second wind turbine in the expectation of an imminent wake loading, and the wake then does not actually occur, the resultant loading of the wind turbine may be greater than if the pre-control had been omitted. In order to avoid such negative effects of the method according to the invention, the second wind turbine may be equipped with load sensors, by which the actual loading of the wind turbine is determined. The loading sensors may comprise, for example, strain gauges in the rotor blades, by which an elastic deformation of the rotor blade can be measured.

In this way, the prediction model can be improved in an automatic learning process. If the control signal derived from the prediction model does not result in the expected reduction in the loading, a corresponding response message can be sent to the prediction model, such that the latter adapts its prediction. In other words, the prediction model can be modified in dependence on a measured actual loading of the second wind turbine. The measurement of the actual loading may be effected, for example, at the future time point. The modification of the prediction model may relate, in particular, to the time span within which a change in the wind direction has propagated from the first wind turbine as far as the second wind turbine.

If, for a future time point, the prediction model predicts a state in which the wake of the first wind turbine partially overlaps the rotor of the second wind turbine, the pitch angle of a rotor blade of the second wind turbine is altered relative to the pitch angle of another rotor blade of the second wind turbine. The alteration may relate to the sector of the rotor revolution in which the covering by the wake of the first wind turbine occurs. In other sectors of the rotor revolution, the rotor blade can return to its previous position. This sequence may be repeated cyclically, such that, upon reaching the same angular position, the rotor blade again adjusts its pitch angle. A corresponding control specification may also be effected for the other rotor blades of the rotor, such that the asymmetrical loading is counteracted by a cyclic adjustment of all rotor blades.

Each wind turbine has a rated electrical energy output, which corresponds to the maximum electrical power the wind turbine can deliver in continuous operation. This maximum electrical power can be referred to as the "nominal output" of the wind turbine. The minimum wind speed necessary for the turbine to generate its nominal electrical output can be referred to as the "nominal wind speed" for the turbine. A cyclic adjustment of the rotor-blade pitch angle is normally associated with a reduction in power drawn from the wind. In order to keep the yield losses low, the second wind turbine may be configured such that the pre-control on the basis of the prediction model is performed only when the present wind speed is above the nominal wind speed, and/or the second wind turbine is presently being operated at nominal output.

It may be advantageous for the method if a sequence of wind direction values and/or wind speed values, which have been determined at differing time points, is stored for the first wind turbine and/or the second wind turbine. Each of the wind direction values/wind speed values may be provided with a time stamp, such that the time point at which the value was recorded is verifiable. The time period over which the sequence of stored values extends may be fixed such that it includes the period required by a wind field, in the case of the lowest wind speed to be taken into consideration, to move from the first wind turbine as far as the second wind turbine. A ring buffer, in which the data are stored over the required time span, and in which older data are automatically replaced by newly received data, may be used for storing the data.

These wind speed values/wind direction values may be stored together with the associated time stamp. In addition, information about the current operating status of the wind turbine concerned may be stored together with the time stamp.

The computing steps necessary for the application of the prediction model may be performed on a central computer of the wind park, to which the first wind turbine and the second wind turbine belong. However, it is also possible to do this in a decentralized manner, by means of a computer of a wind turbine.

The method according to the invention may be executed with more than two wind turbines. In particular, the method may be executed with at least 10, preferably at least 20, more preferably at least 50 wind turbines. In the case of the arrangement of wind turbines according to the invention, the wind turbines are spatially arranged in relation to each other such that, depending on the wind direction, each wind turbine can come into the wake of at least one other wind turbine of the arrangement. The arrangement of wind turbines may be configured as a wind park, having a central controller, which issues specifications for the operation of individual wind turbines.

If the method is executed with more than two wind turbines, the method according to the invention may comprise the step, dependent on the wind direction, of performing a sorting of the wind turbines, according to which the wind turbines are sorted into pairs of first and second wind turbines, such that in each pair, in the case of the present wind direction, the second wind turbine is located in the wake of the first wind turbine. It is possible in this case for an individual wind turbine in a first pair to assume the role of the first wind turbine, and at the same time, in a second pair, to assume the role of the second wind turbine.

The invention additionally relates to a control system, having an acquisition means for recording a current wind value of a first wind turbine, and having a prediction model, which is designed, by processing the current wind value, to predict a future time point at which a second wind turbine, located in the wake of the first wind turbine, is partially overlapped by the wake of the first wind turbine, and in which, in reaction to the prediction, the control system generates a control signal, in order to alter the pitch angle of a rotor blade of the second wind turbine relative to the pitch angle of another rotor blade of the second wind turbine. The invention additionally relates to an arrangement of wind turbines, which is equipped with such a control system.

In a preferred embodiment, the control system has a plurality of control computing facilities. The wind prediction in this case is preferably performed on a central computing facility for the entire wind park. The respective wind prediction of an individual wind turbine is transmitted from the central computing facility to the control units of a plurality of individual wind turbines. The respective control units of the individual wind turbines then generate control signals for the individual wind turbines from the transmitted wind prediction.

The control system may be enhanced with further features, which are described in connection with the method according to the invention. The method may be enhanced with further features, which are described in connection with the control system according to the invention.

BRIEF DESCRIPTION OF THE DRAWINGS

The invention is described exemplarily in the following with reference to the appended drawings, on the basis of advantageous embodiments. There are shown.

DETAILED DESCRIPTION

Figure 1:
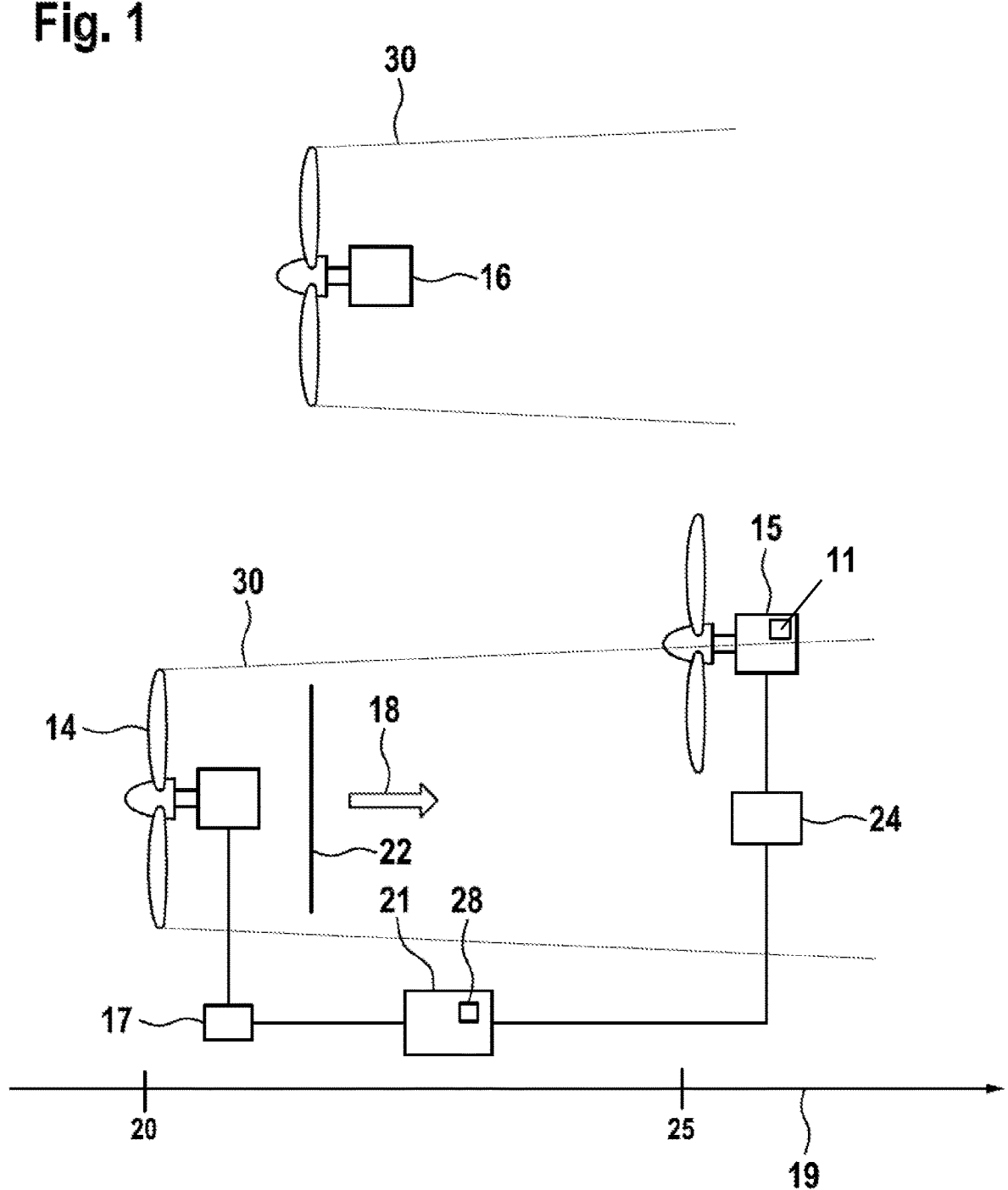
FIG. 1: an arrangement of wind turbines according to the invention.

An arrangement of wind turbines shown in FIG. 1 comprises a first wind turbine 14, a second wind turbine 15 and a third wind turbine 16. Each wind turbine 14, 15, 16 comprises a rotor, which is put into rotation by the wind and which drives a generator for the purpose of generating electrical energy. Each of the wind turbines 14, 15, 16 additionally comprises a wind estimator 17, which in FIG. 1 is represented only on the example of the wind turbine 15.

The wind estimators 17 are designed to determine, for each of the wind turbines 14, 15, 16, an estimated value for the wind speed and possibly also for the wind direction. Each estimated value is derived from one or more operating parameters, which change in dependence on the air-mass flow acting upon the entire rotor. These operating parameters may comprise, for example, the rotational speed of the rotor, the pitch angle of the rotor blades and the torque applied by the rotor. Since the rotor sweeps a large area, reliable values for the wind speed, and optionally also those for the wind direction, can be estimated by means of the wind estimator 17. The latter requires additional measurement values, preferably, for example, a measurement of the individual blade motion or deformation, or a measurement of the tower motion or deformation.

According to aspects of the invention, a control system implementing the disclosed prediction model 28 includes acquisition means for recording a current wind value of a first wind turbine (14). Acquisition means includes sensors and measurements of the condition and operating parameters of a wind turbine, a system for communicating this data to a computer, and calculations performed on the sensor readings and measured values to determine a current estimated wind value for a wind turbine at a time point. A wind turbine 15 may be equipped with load sensors 11 to determine an actual wind load acting on the wind turbine 15. A current estimated wind value may be used in the prediction model as the current wind value according to aspects of the invention.

In the case of the wind direction 18 prevailing in FIG. 1, the second wind turbine 15 is located downwind from the first wind turbine 14. The distance between the second wind turbine 15 and the first wind turbine 14, as viewed in the wind direction, is such that the second wind turbine 15 is located in the wake 30 of the first wind turbine 14. Thus, in the case of the wind direction 18, the wind conditions experienced by the second wind turbine 15 are influenced by the operation of the first wind turbine 14.

Although the third wind turbine 16 is also located upwind of the second wind turbine 15, the third wind turbine 16 is offset so far to the side that there is no intersection between the wake 30 of the third wind turbine 16 and the rotor of the second wind turbine 15. At the start of the method according to the invention, it is ascertained, taking into account the current wind direction, which wind turbines are located in the wake of which other wind turbines. In the exemplary embodiment according to FIG. 1, only the second wind turbine 15, located in the wake of the first wind turbine 14, is affected.

Estimated wind values of all three wind turbines 14, 15, 16 are determined, at the current time point 20, on the time axis 19 in FIG. 1. The estimated wind values are passed to a prediction computer 21, in which there is a stored prediction model 28. The estimated wind values are fed into the prediction model 28, which processes the estimated wind values in order to predict how the wake 30 of the first wind turbine 14 will spread.

A propagation direction and a propagation speed of the wake are determined by means of the prediction model 28. In the example according to FIG. 1, the propagation direction is derived from the current wind direction 18, and the propagation speed from the wind speed. In FIG. 1 this is represented schematically by a front line 22, which is aligned parallel to the rotor of the first wind turbine 14 and which moves downwind. A mean value of the wind direction estimated in the case of the wind turbines 14, 16 is assumed as a current wind direction. The flow received by both wind turbines 14, 16 is unobstructed, such that the wind direction is not falsified by the wake of a wind turbine located farther to the front. In other embodiments of the invention, an estimated value obtained in the case of the second wind turbine 15 may also be taken into account in the determination of the current wind direction. A corresponding procedure may be applied in determining the current wind speed.

A control unit 24 of the second wind turbine 15 may request, from the prediction computer 21, how the wake 30 of the first wind turbine 14 is likely to affect the second wind turbine 15 at the future time point 25. In the exemplary embodiment according to FIG. 1, at the future time point 25 there is a partial overlap between the wake 30 of the first wind turbine 14 and the rotor of the second wind turbine 15.

As a reaction to this prediction, shortly before the time point 25 the control unit 24 generates a control signal, according to which the pitch angle of the rotor blades of the second wind turbine 15 is adapted, before the time point 25, in dependence on the angular position of the respective rotor blade (pre-control). In particular, in the angular range of the rotor revolution in which there is an intersection with the wake 30 of the first wind turbine 14, each rotor blade may have a pitch angle that differs from that in other angular ranges of the rotor revolution. The control signal of the control unit 24 can thus effect a cyclic alteration of the pitch angle, and the control signals can be repeated after their complete rotor revolution.

A current value of the turbulence intensity may additionally be determined at the current time point 20. The turbulence intensity may be determined, for example, from the standard deviation of the output power delivered by the first wind turbine 14. The prediction computer 21 may be designed such that it also determines a propagation of the turbulence intensity, and makes a corresponding prediction for the future time point 25. The control specification of the control unit 24 for the second wind turbine 15 may also depend on the turbulence intensity predicted for the time point 25.

Figure 2:
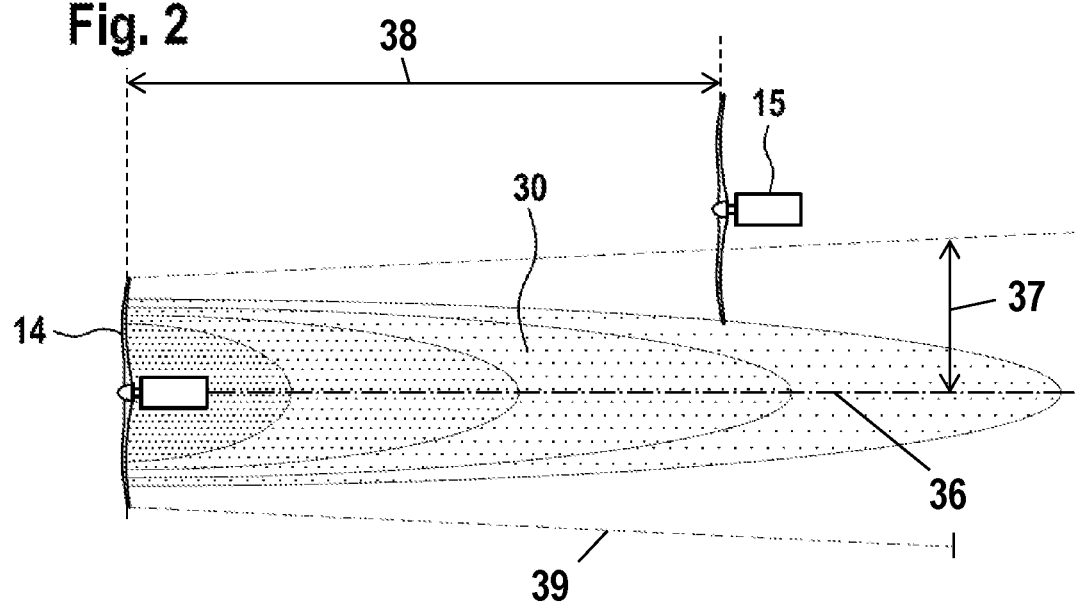
FIG. 2: a schematic representation of a prediction model according to the invention.

Illustrated in FIG. 2 are some assumptions on which the prediction model 28 for the wake is based. If constant wind conditions are assumed, the wake 30 propagates rearwards, behind the rotor blade of the first wind turbine 14, concentrically in relation to the rotor axis. In the region of the first wind turbine 14, the cross section of the wake 30 corresponds to the area swept by the rotor. As the distance from the first wind turbine 14 increases, the wake 30 widens slightly in the radial direction.

In the region of the wake 30 the wind speed is less than it would be in a wind field not disturbed by the first wind turbine 14. The wind speed deficit is greatest in the region directly adjoining the rotor (with dark coloring). As the distance from the first wind turbine 14 increases in the downwind direction, and as the distance from the central axis of the wake 30, represented by a broken line, increases, the wind speed deficit becomes less. Accordingly, in FIG. 2, the second wind turbine 15 is affected only by a slight wind speed deficit, in the edge region of the wake 30.

Figure 3:
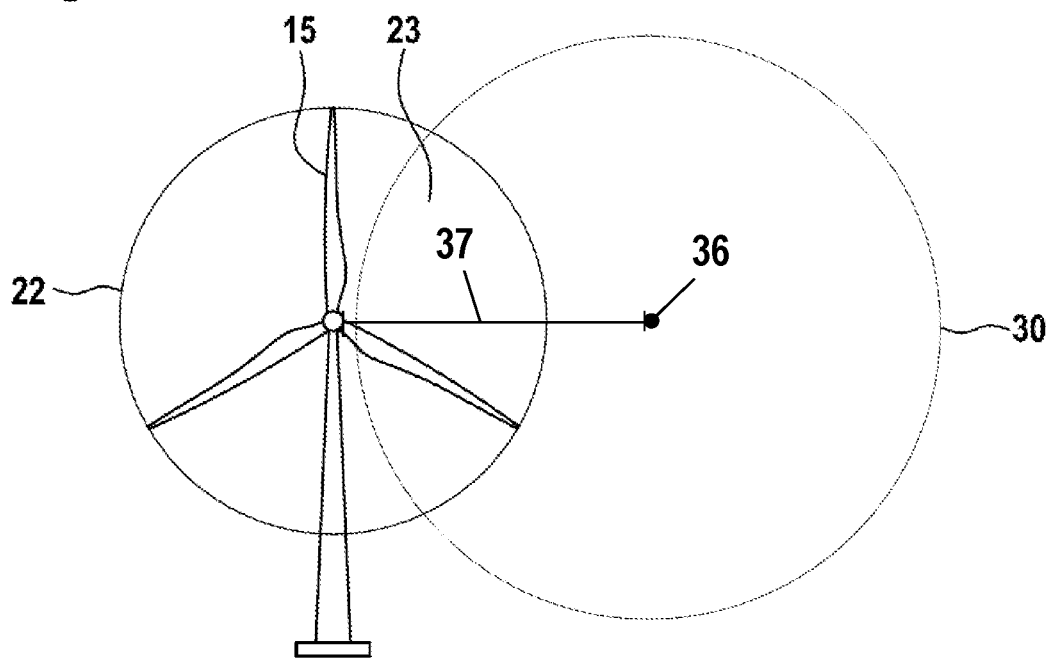
FIG. 3: a partial overlap between the wake of a first wind turbine and the rotor of a second wind turbine.

In FIG. 3, the area swept by the rotor of the second wind turbine 15 is identified by a circle 22. According to the prediction model 28, the wake 30 likewise has a circular cross section in the plane of the rotor of the second wind turbine 15. Between the wake 30 and the area 22 swept by the rotor there is a partial overlap, in the region 23.

Figure 4:
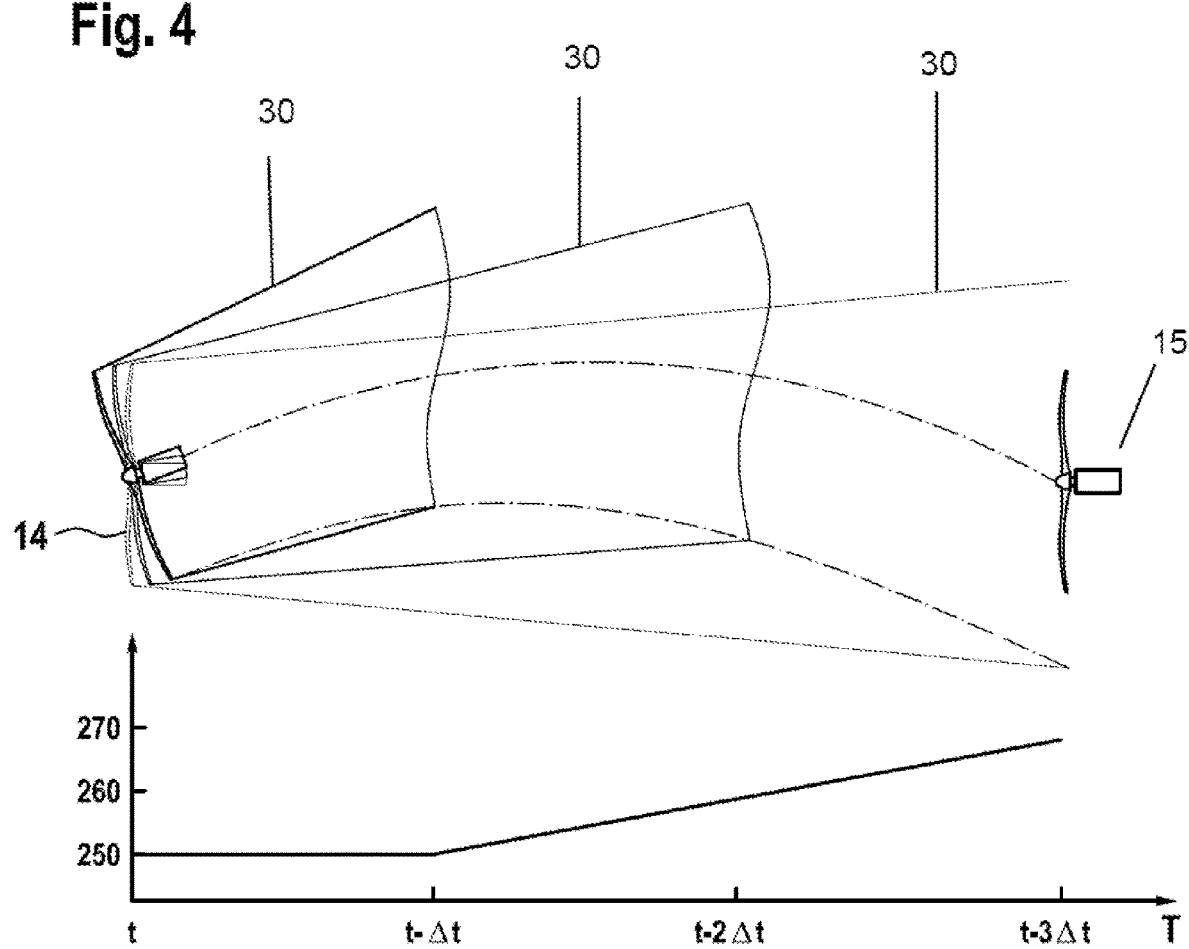
FIG. 4: an aspect of the prediction model according to the invention.

FIG. 4 shows an exemplary possibility of how changes in the wind direction can be mapped in the prediction model 28. Represented is a period between a current time point t and a past time point t−3Δt. At the past time point t−3Δt the wind came from 270°, such that the second wind turbine 15 was located entirely in the wake 30 of the first wind turbine 14. Between t−3Δt and t−2Δt the wind direction turned by 10°, to 260°. Owing to the wake 30, there is a resultant delay until this change in the wind direction reaches the second wind turbine 15. Between t−2Δt and t−Δt the wind turns by a further 10°, to 250°, and maintains this new wind direction up to the current time point t. The graphic indicates the respective delay until the changed wind direction has propagated into the wake 30.

Figure 5:
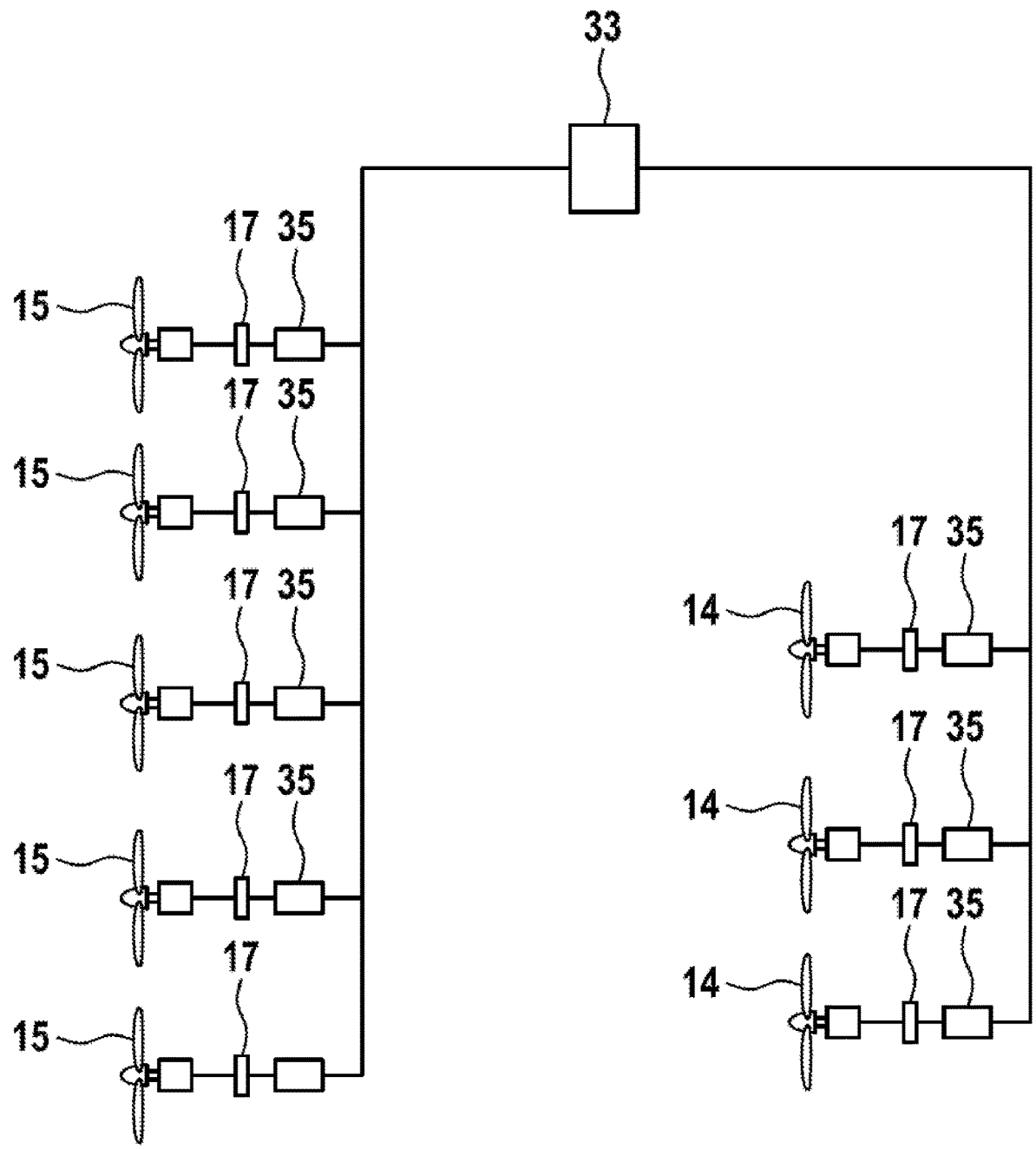
FIG. 5: an arrangement of wind turbines according to the invention.

In the case of the wind park represented schematically in FIG. 5, the wind turbines located upwind, as first wind turbines 14, are represented separately from the second wind turbines 15 located downwind. The basic pair-wise allocation between first wind turbines 14 and second wind turbines 15 is dependent on the wind direction, and must be adapted upon each change in the wind direction. All wind turbines 14, 15 are equipped with wind estimators 17, which send estimated wind values to a central buffer 33. In the central buffer 33, the estimated wind values are stored together with the geographical coordinates of the respective wind turbine and with an associated time stamp. In addition to this, in each case information may be stored about the operating state of the wind turbine concerned at the respective time point.

The data are stored in the buffer 33 for as long as is required by the slowest wind field to be considered to move over the greatest extent of the wind park. The slowest wind field to be considered may have a speed, for example, corresponding to the cut-in wind speed of the wind turbines. The buffer 33 is realized as a ring buffer, such that the oldest data of this period are in each case replaced by newer data.

Each wind turbine 14, 15 is equipped with a decentralized prediction computer 35, which can access the estimated wind values in the buffer 33. For each second wind turbine 15 located downwind, a geographical sector, in which a first wind turbine 14 could generate a disturbing wake, is obtained from the current wind direction. By requesting the geographical coordinates of the first wind turbines 14 that are stored in the buffer 33, the prediction computer can identify individual wind turbines 14 that potentially could cause a disturbing wake. As a result of the prediction computer 35 accessing the current estimated wind values of the respective first wind turbine in the buffer 33, the prediction computer can predict whether a disturbing wake 30 is soon to be anticipated for its own wind turbine 15. If this is the case, shortly before the arrival of the disturbing wake the wind turbine 15 can generate a control signal, according to which the rotor blades are pitched cyclically.

Figure 6:
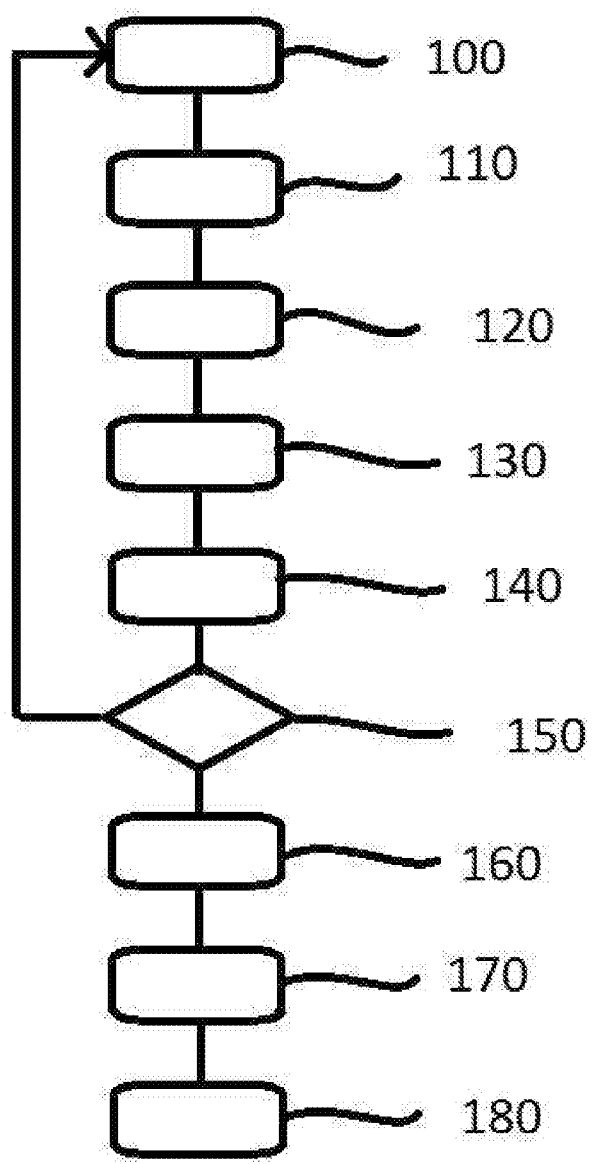
FIG. 6: a flow chart showing an example of steps in applying a prediction model according to aspects of the invention.

With reference to FIG. 6, the method step of applying the prediction model is explained in more detail. The method starts in step 100. In step 110 a current value of the wind speed and a current value of the wind direction at the first wind turbine 14 are obtained.

In step 120 a wake 30 of the first wind turbine 14 is determined so that a central axis 36 of the wake is coaxial to the rotor axis of the first wind turbine 14 and so that the wake 30 is circular in cross-section. The wake 30 may have a length 39 that corresponds to four times the rotor diameter of the first wind turbine 14.

In one embodiment the wake 30 has a constant diameter over its length 39, wherein the diameter corresponds to the diameter of the rotor of the first wind turbine 14. In another embodiment the diameter of the wake 30 increases with increasing distance from the first wind turbine 14.

In step 130 an axial distance 38 between the first wind turbine 14 and the second wind turbine 15 is determined. In step 140 a radial distance 37 between the central axis 36 of the wake 30 and the rotor axis of the second wind turbine 15 is determined.

In step 150 it is determined whether there is an overlap between the wake 30 of the first wind turbine 14 and the rotor of the second wind turbine 15. This is done by comparing the length 39 of the wake 30 with the axial distance 38 between the first wind turbine 14 and the second wind turbine 15 and by comparing the radial distance 37 with the radius of the rotor of the second wind turbine 15 and with the radius of the wake 30. If the axial distance 38 is smaller than the length 39 of the wake 30 and if the radial distance 37 is smaller than the sum of the radius of the rotor of the second wind turbine 15 and the radius of the wake 30 at the same axial position, there is an overlap between the wake 30 and the rotor of the second wind turbine 15. If one of the two conditions is not met there is no overlap between the wake 30 and the rotor of the second wind turbine 15. In this case the method starts over with step 100.

If there is an overlap the method proceeds to step 160. In step 160 a future time point 25 is determined when the second wind turbine 15 is hit by the currently determined wake 30 of the first wind turbine. This is done by dividing the axial distance 38 between the first wind turbine 14 and the second wind turbine 15 by the propagation speed of the wake, which propagation speed in one embodiment corresponds to the wind speed obtained in step 110.

In step 170 a control signal is generated at time point 25 or before time point 25 for altering a pitch angle of a rotor blade of the second wind turbine 15 relative to the pitch angle of another rotor blade of the second wind turbine 15. The method ends in step 180.

Steps 120, 130, 140, 150, 160 are an exemplary mode of predicting a future time point 25 at which there is an overlap between a wake of the first wind turbine 14 and an area swept by a rotor of the second wind turbine 15. Other embodiments of determining the wake 30 and of determining the future time point 25 are described in this specification.

The invention claimed is:

1. A method for operating a first wind turbine (14) and a second wind turbine (15), the second wind turbine (15) being located downwind of the first wind turbine (14), said method comprising:
    providing a current wind value of the first wind turbine (14) to a prediction model (28), said current wind value comprising a current wind speed value or a current wind direction value;
    in said prediction model (28), using the current wind value of the first wind turbine (14) to predict a future time point (25) at which an area swept by a rotor of the second wind turbine (15) overlaps a wake (30) of the first wind turbine (14);
    in response to said prediction, generating a control signal to alter a pitch angle of a rotor blade of the second wind turbine (15) relative to the pitch angle of another rotor blade of the second wind turbine (15) before the future time point (25); and
    beginning to adapt the pitch angle of the rotor blades of the second wind turbine (15) to the control signal before the future time point.

2. The method of claim 1, wherein the prediction model (28) comprises an assumption that the wake (30) widens in a radial direction as a distance from the first wind turbine (14) increases.

3. The method of claim 1, wherein the prediction model (28) comprises an assumption that a wind speed in the wake (30) is reduced in comparison with a wind field that is not disturbed by the first wind turbine (14).

4. The method of claim 1, wherein the prediction model (28) comprises an assumption that the wind speed in the wake (30) has a radial distribution according to which a wind speed in the center of the wake (30) is less than in the periphery of the wake (30).

5. The method of claim 1, wherein the prediction model (28) comprises an assumption that the turbulence intensity in the wake (30) is increased in comparison with a wind field that is not disturbed by the first wind turbine (14).

6. The method of claim 1, comprising determining an estimated wind value on the basis of an air mass-flow acting upon the entire rotor of the first wind turbine (14); and
    using the estimated wind value as the current wind value of the first wind turbine (14).

7. The method of claim 1, wherein the current wind value of the first wind turbine (14) and a current wind value the second wind turbine (15) are used to predict a propagation direction of the wake (30).

8. The method of claim 1, wherein the prediction model maps a wind prediction into a geographical coordinate system.

9. The method of claim 8, wherein a location of the first wind turbine (14) and the location of the second wind turbine (15) are defined by coordinates within the geographical coordinate system.

10. The method of claim 1, wherein the current wind value comprises a value for turbulence intensity derived from a standard deviation of a current output power of the first wind turbine (14).

11. The method of claim 1, wherein the prediction model (28) determines a time span within which a change in wind direction propagates from the first wind turbine (14) to the second wind turbine (15) as the sum of a time lag, which is derived from the current wind speed value and a wake-related additional time.

12. The method of claim 1, comprising:
equipping the second wind turbine (15) with load sensors to determine an actual wind load acting on the second wind turbine (15).

13. The method of claim 1, comprising:
determining a sequence of current wind values at different time points for the first wind turbine (14) or the second wind turbine (15); and
storing the sequence of current wind values for the first wind turbine (14) or the second wind turbine (15).

14. The method of claim 1, wherein the pitch angle of the rotor blades of the second wind turbine (15) is adapted to the control signal before the future time point.

15. A control system for wind turbines, said control system comprising:
an acquisition means for recording a current wind value of a first wind turbine (14),
a prediction model (28) that processes the current wind value to predict a future time point (25) at which a second wind turbine (15), located in a wake (30) of the first wind turbine (14), is overlapped by the wake (30) of the first wind turbine (14),
wherein, in response to said prediction, the control system generates a control signal to alter a pitch angle of a rotor blade of the second wind turbine (15) relative to a pitch angle of another rotor blade of the second wind turbine (15) before the future time point (25) and begins to adapt the pitch angle of the rotor blades of the second wind turbine (15) to the control signal before the future time point.

16. The control system of claim 15, wherein the pitch angle of the rotor blades of the second wind turbine (15) is adapted before the future time point (25).

17. The control system of claim 16, wherein the pitch angle of the rotor blades of the second wind turbine according to the control signal varies depending upon the angular position of each rotor blade.

18. A method for operating a first wind turbine (14) and a second wind turbine (15), the second wind turbine (15) being located downwind of the first wind turbine (14), said method comprising:
when a current wind speed at said first turbine (14) is above a nominal speed or the second wind turbine (15) is presently being operated at a nominal output;
providing a current wind value of the first wind turbine (14) to a prediction model (28), said current wind value comprising a current wind speed value or a current wind direction value;
in said prediction model (28), using the current wind value of the first wind turbine (14) to predict a future time point (25) at which an area swept by a rotor of the second wind turbine (15) overlaps a wake (30) of the first wind turbine (14); and
in response to said prediction, generating a control signal to alter a pitch angle of a rotor blade of the second wind turbine (15) relative to the pitch angle of another rotor blade of the second wind turbine (15).

* * * * *